B. B. NEUTEBOOM.
TANK SUSPENSION FOR MOTOR VEHICLES.
APPLICATION FILED AUG. 29, 1918.
1,347,051.
Patented July 20, 1920.
2 SHEETS—SHEET 2.
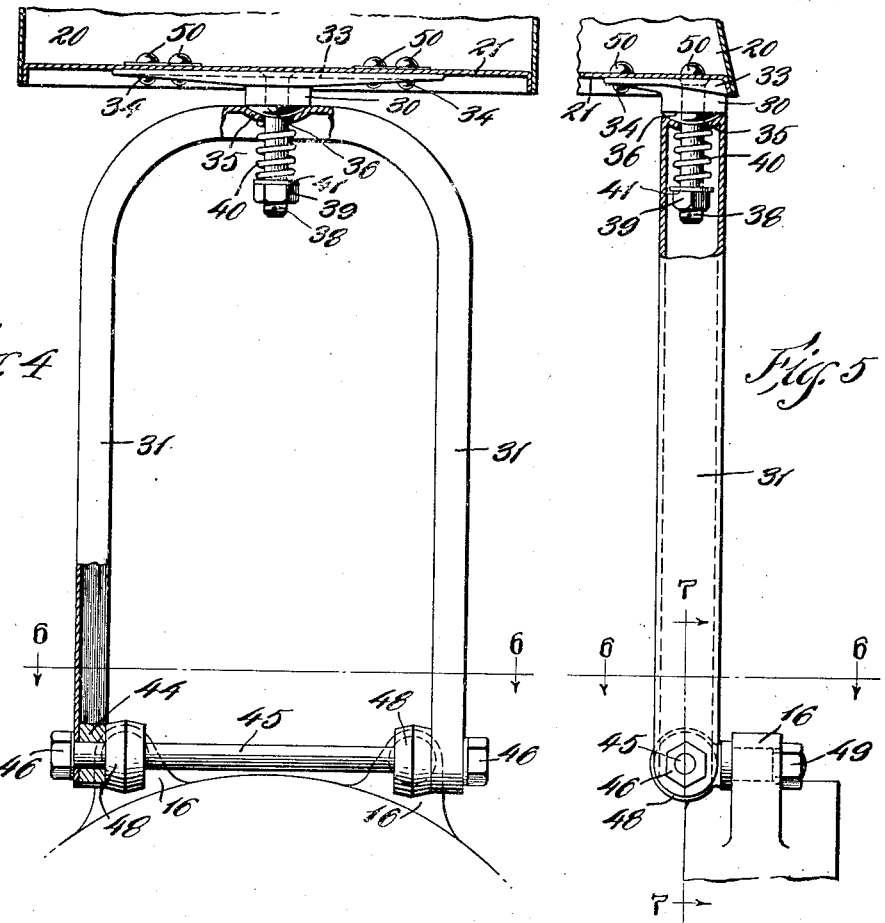
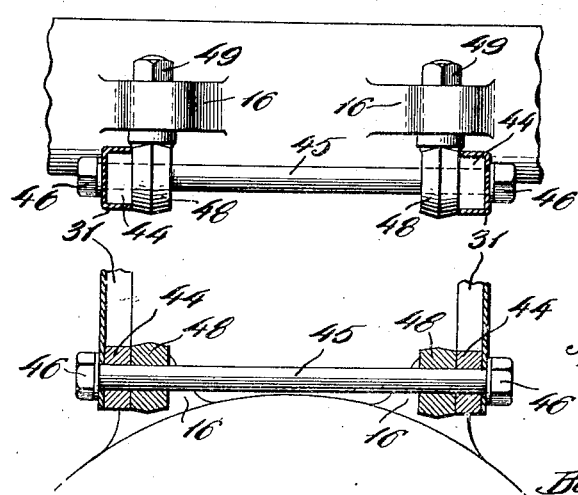
Inventor
Boudewijn B. Neuteboom.
By Hull, Smith, Brock & West
Attys.

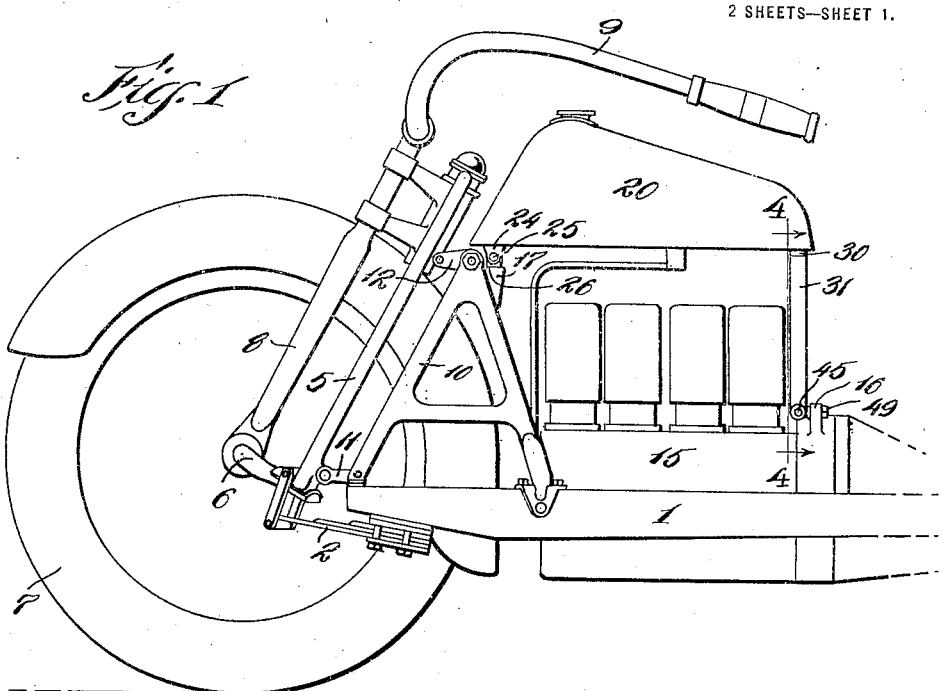

UNITED STATES PATENT OFFICE.

BOUDEWIJN B. NEUTEBOOM, OF DETROIT, MICHIGAN, ASSIGNOR TO THE MILITOR CORPORATION, OF NEW YORK, N. Y., A CORPORATION OF NEW YORK.

TANK SUSPENSION FOR MOTOR-VEHICLES.

1,347,051.  Specification of Letters Patent.  Patented July 20, 1920.

Application filed August 29, 1918. Serial No. 251,981.

*To all whom it may concern:*

Be it known that I, BOUDEWIJN N. NEUTEBOOM, a subject of the Queen of the Netherlands, residing at Detroit, in the county of Wayne and State of Michigan, have invented a certain new and useful Improvement in Tank Suspensions for Motor-Vehicles, of which the following is a full, clear, and exact description, reference being had to the accompanying drawings.

The fundamental purpose of this invention is to provide a support for the tanks (such as those containing fuel and lubricating oils) of motor vehicles (particularly motor-cycles) that is of a yielding or flexible nature, so that the twisting or flexing usual in the frames of vehicles of this class will not be imparted to the tanks thereby to impose upon them torsional strains which are liable to and very often do result in leakage.

Further objects of the invention are to provide a comparatively simple and durable tank supporting means which will fulfil the above purpose and which may be economically produced and quickly and conveniently assembled and disassembled; and to provide means sealing the tank against leakage when it is attached to the supporting means.

In the accompanying drawings I have illustrated a construction through which the objects above enumerated are attained, and while I shall proceed to describe this present construction in detail I wish to be understood as not limiting myself to the structural details thereof further than is required by the terms of the claims annexed hereto.

In the drawings, Figure 1 is a partial side elevation of a motorcycle wherein the fuel tank is supported in accordance with my invention; Fig. 2 is an enlarged sectional detail through one of the forward corners of the tank, the plane of section being suggested by the line 2—2 of Fig. 3; Fig. 3 is a sectional front elevation of the parts shown in Fig. 2; Fig. 4 is a vertical section through the rear end of the tank as indicated by line 4—4 of Fig. 1; Fig. 5 is a side view of the parts shown in Fig. 4; Fig. 6 is a horizontal section on the lines 6—6 of Figs. 4 and 5; while Fig. 7 is a vertical section on the line 7—7 of Fig. 5.

The vehicle in which I have shown my invention incorporated is a motor cycle of the type comprising a horizontal frame 1 which is suspended at its forward end through springs 2, from a supporting structure 5 involving a bearing member or axle 6 upon which the front or steering wheel 7 is adapted to be turned through the intervention of forks 8 by the handle-bars 9. A-shaped brackets 10 rise from the opposed sides of the forward end of the frame 1 and are connected, through links 11 and 12, with the supporting structure 5. While these parts appear in singular in the drawings since the vehicle is shown only in side elevation, it will be understood that the parts are duplicated on the opposite side. A motor 15 is suspended within the frame 1 immediately to the rear of the brackets 10 and from a portion of the casing rise lugs 16. A ledge 17 connects the upper ends of the A-frames 10, and, with the lugs 16, constitute the tank supporting parts of the vehicle structure.

The tank is designated 20 and consists of a shell into the lower side of which is fitted a bottom 21, the same having secured to its forward end, as by rivets 22, a plate 23 having perforated lugs 24 depending from its opposite ends within which are mounted the ends of a rod 25 having bearing, just inside the lugs 24, in L-shape brackets 26, shown as secured by rivets 27 to the ledge 17. Washers 28 may be applied to the rod 25 immediately inside the brackets 26, and cotter pins 29 are shown as passing through the rod adjacent the washers to hold the rod against endwise movement. This construction provides a simple, yet thoroughly substantial hinge connection between the forward end of the tank and vehicle frame, and one that is extremely convenient of assembly and disassembly.

The rear end of the tank is supported through a bearing member 30 and yoke 31, from the lugs 16 of the vehicle structure. The supporting plate 33 of the bearing member 30 is attached to the bottom 21 of the tank as by rivets 34. The yoke 31 is preferably of channel formation, with the channel opening inward, and its web is depressed adjacent the bearing member 30 to form a shallow socket 35 conforming in shape to the spherical end 36 of the bearing member. A bolt 38 passes downward through holes in the bearing member and yoke and has a nut 39 applied to its lower end between which and the web of the channel a compression spring 40 is interposed, a washer 41 being shown between the nut and adjacent end of the spring.

This form of connection provides what is, in effect, a ball and socket bearing between the tank and yoke, the same yielding to any relative movement between the tank and yoke that is caused by the flexing or deformation of the vehicle structure.

Bearing blocks 44 are set into the lower ends of the branches of the yoke 31 and these blocks and the adjacent portions of the web of the yoke have registering apertures within which the ends of a rod 45 are supported, and the rod having retaining nuts 46 applied to its opposite ends. Immediately inside the branches of the yoke 31, the rod 45 has bearing within eye bolts 48, the shanks whereof pass through bores in the lugs 16 and have nuts 49 applied to their rear ends for clamping them within the lugs. This produces a connection between the yoke 31 and vehicle structure similar to that described in connection with the forward end of the tank.

To prevent possible leakage about the rivets 22 and 34 which connect the plates 23 and 33 to the tank bottom 21, I provide caps 50 which are fitted over the rivet heads and soldered or otherwise secured to the bottom of the tank in a leak-proof manner.

Having thus described my invention what I claim is:

1. The combination of a vehicle structure, a tank hingedly connected to the structure at one point, and a connection between the tank and structure at another point that is capable of universal movement.

2. The combination of a vehicle structure, a tank, an element having a spherical portion carried by one, and an element having a receiving socket therefor carried by the other.

3. The combination of a vehicle structure, a tank, an element having a spherical portion carried by one, an element having a receiving socket therefor that is carried by the other, and means yieldingly retaining the elements in engagement.

4. The combination of a vehicle structure, a rod supported thereby, a tank, a member carried by the tank having bearing portions mounted upon said rod, and flexible connections between a part of said tank remote from said member and the vehicle structure.

5. The combination of a vehicle structure, brackets carried by the structure in spaced relation to each other, a rod sustained by the brackets, a tank, a member carried by the tank and having bearing portions engaged upon the rod and held in place by the aforesaid brackets.

6. The combination of a vehicle structure, rod supporting means carried thereby, a rod sustained by said means, a tank, and spaced bearing members carried by the tank and engaging the rod at each end beyond said means and co-acting with said means to hold the tank against displacement longitudinally of the rod.

7. The combination of a vehicle, an element pivotally connected thereto, a tank, a bearing member carried by the tank, the bearing member and element having one a spherical portion and the other a socket for the reception of said portion.

8. The combination of a vehicle structure, a member pivotally connected thereto, a tank, a member carried by the tank, one of said members having a spherical portion and the other a socket for the reception of said portion, the members having registering apertures the axes whereof are substantially coincident with the axis of the spherical portion, a member extending through said apertures, and means carried by said member for yieldingly retaining the aforesaid spherical portion within the socket.

9. The combination of a vehicle structure, a tank hingedly connected to the structure at one point, an element having spaced parts pivotally connected to the structure at a point remote from the aforesaid connection, and a connection between the tank and element that is capable of universal movement.

10. The combination of a vehicle structure having attaching means and a supporting part at a higher elevation than said means and spaced therefrom longitudinally of the structure, a tank having one of its ends hingedly connected to the supporting part, an element having spaced parts pivotally connected to the aforesaid attaching means, and a yielding connection between said element and the opposite end of the tank.

In testimony whereof I hereunto affix my signature.

BOUDEWIJN B. NEUTEBOOM.